United States Patent [19]
Arakawa

[11] Patent Number: 5,281,787
[45] Date of Patent: Jan. 25, 1994

[54] WIRE FEED DEVICE
[75] Inventor: Yasuo Arakawa, Oshino, Japan
[73] Assignee: Fanuc Ltd., Minamitsuru, Japan
[21] Appl. No.: 854,592
[22] PCT Filed: Oct. 11, 1991
[86] PCT No.: PCT/JP91/01391
   § 371 Date: Jun. 10, 1992
   § 102(e) Date: Jun. 10, 1992
[87] PCT Pub. No.: WO92/06813
   PCT Pub. Date: Apr. 30, 1992

[30] Foreign Application Priority Data
Oct. 19, 1990 [JP] Japan .................................. 2-279306

[51] Int. Cl.⁵ .............................................. B23H 7/10
[52] U.S. Cl. ............................ 219/69.12; 242/157 R
[58] Field of Search ..................... 242/157.1, 157 R; 219/69.12

[56] References Cited
U.S. PATENT DOCUMENTS

| | | | |
|---|---|---|---|
| 2,228,346 | 1/1941 | Downie | 242/157.1 |
| 2,387,245 | 10/1945 | Davidson et al. | 242/157.1 |
| 4,343,443 | 8/1982 | Grounds | 242/157 R |
| 4,616,553 | 10/1986 | Nixon | 242/157.1 |
| 4,778,121 | 10/1988 | Minnee | 242/157.1 |
| 4,892,262 | 1/1990 | Hurst | 242/157.1 |
| 5,077,457 | 12/1991 | Onaka et al. | 219/69.12 |

FOREIGN PATENT DOCUMENTS

| | | |
|---|---|---|
| 56-9133 | 1/1981 | Japan . |
| 58-109227 | 6/1983 | Japan . |
| 64-87116 | 9/1987 | Japan . |
| 62-215474 | 9/1987 | Japan . |

Primary Examiner—Geoffrey S. Evans
Attorney, Agent, or Firm—Staas & Halsey

[57] ABSTRACT

A wire feed device for a wire cut electric spark machine in which a wire is delivered from a wire bobbin in the direction orthogonal to the axis of the wire bobbin to prevent a "jump" of the wire as well as a fluctuation in wire tension arising from the jump, and which can reduce a space required for the arrangement thereof, includes a roller intervening between a wire bobbin with a wire accumulatively wound therearound, and a guide roller. The intervening roller is adapted to reverse the delivery direction of the wire sent from the wire bobbin toward the guide roller, and presents an outer peripheral surface having surface capable of not only confining at all times a wire delivery angle within a predetermined angle regardless of a wire delivery position, but also maintaining the same length of the wire extending from the wire delivery position, via the intervening roller, up to the guide roller.

7 Claims, 5 Drawing Sheets

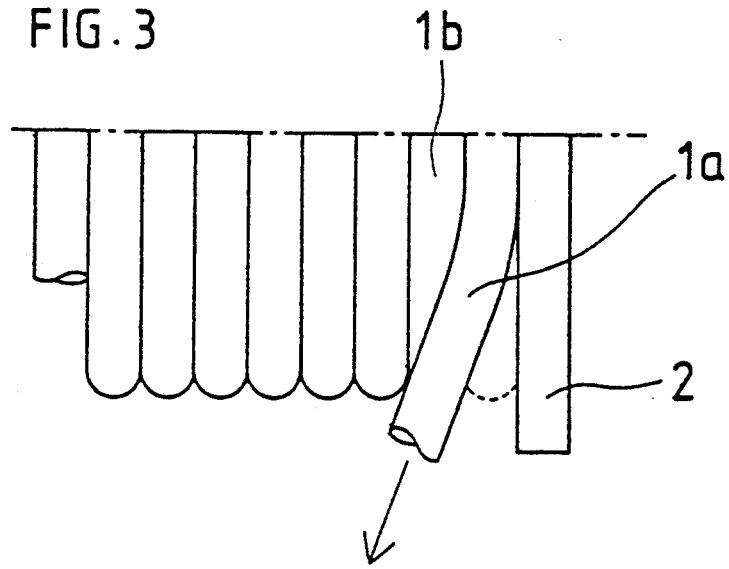
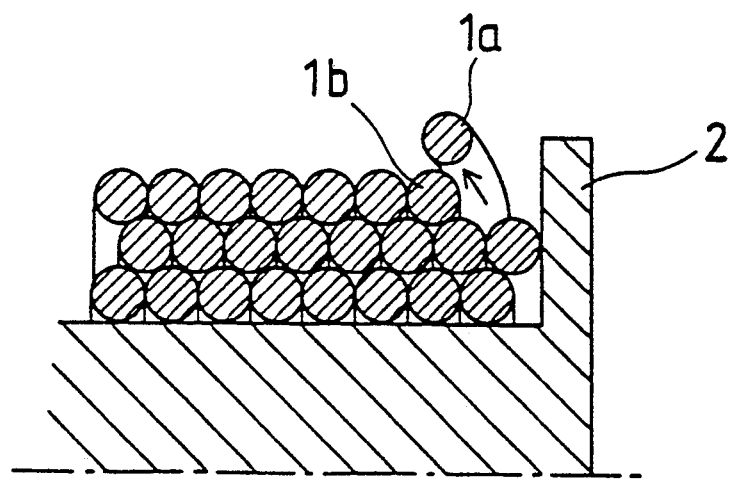

WIRE FEED DEVICE

TECHNICAL FIELD

The present invention relates to a wire feed device for a wire cut electric discharge machine, and more particularly, is directed to a wire feed device capable of preventing a fluctuation in tension applied to a wire electrode.

BACKGROUND ART

For the purpose of machining a workpiece, a wire cut electric discharge machine intermittently generates a spark or discharge between the workpiece and a wire electrode (hereinbelow, referred to simply as a wire) running along a wire running passage, while displacing the wire with respect to the workpiece. A wire feed device to be mounted on the electric discharge machine and for running the wire, typically comprises a wire bobbin, a guide roller for guiding the wire, a tension roller operative to apply a tension to the wire, and a feed roller for the drive of the wire, in which the wire is tensioned along the wire running passage extending through the above-described rollers, and then the feed roller is rotationally driven to deliver the subsequent wire from the wire bobbin.

During the delivery of the wire, a wire delivery position lying on the wire bobbin is displaced in the width direction of the bobbin, and the direction in which the wire delivery position is displaced is reversed when the outermost wire layer is replaced by the subsequent wire layer. With the displacement of the wire delivery position, there varies an angle (hereinafter, referred to as a wire delivery angle) defined by an imaginary line extending through the wire delivery position and orthogonally to the axis of the wire bobbin, and a line obtained by projecting the wire let out from the wire bobbin onto an imaginary plane extending through the wire delivery position.

In case the wire is delivered diagonally from the wire bobbin toward the guide roller with a larger wire delivery angle, the delivered wire possibly runs onto the adjacent wire constituting a wire layer to which that wire is to belong. On the contrary, with the displacement of the wire delivery position, the wire which ran onto the adjacent wire possibly returns to the ordinary winding position. Such running onto the adjacent wire and or return to its ordinary position of the wire (hereinafter, referred to as a "jump" of the wire), may lead to a fluctuation in the wire tension, to degrade the machining accuracy, in particular, the surface roughness, which brings about a deterioration in quality of machined product.

Incidentally, it is possible to reduce the wire delivery angle which would otherwise cause a "jump", by enlarging the interval between the wire bobbin and the guide roller. The provision of a greater interval between the wire bobbin and the guide roller enough to prevent the occurrence of "jump" leads to an excessive enlargement in size of the electric discharge machine, which is impractical.

SUMMARY OF THE INVENTION

It is the object of the present invention to provide a wire feed device operative to deliver a wire from a wire bobbin in the direction orthogonal to the axis thereof, thereby preventing a "jump" of the wire and a fluctuation caused by the "jump" as well as accomplishing a reduction in the space required for the arrangement thereof.

In order to achieve the above object, the wire feed device of the present invention which is mounted onto the wire cut electric discharge machine comprises a wire bobbin with a wire accumulatively wound therearound, a drive means for driving the wire in the direction of a wire delivery, a guide roller for guiding the wire, and an intermediate roller intervening between the wire bobbin and the guide roller in a wire running passage and adapted to reverse the delivery direction of the wire let out from the wire bobbin to direct the wire toward the guide roller. The intermediate roller includes an outer peripheral surface formed into a surface intended to restrict a wire delivery angle at all times within a predetermined angle regardless of a wire delivery position on the wire bobbin, the wire delivery angle being defined by an imaginary line horizontally extending through the wire delivery position and orthogonally to the axis of the wire bobbin, and a line obtained by projecting the wire let out from the wire bobbin onto an imaginary horizontal plane extending through the wire delivery position.

According to the present invention as described above, the intermediate roller intervening between the wire bobbin and the guide roller acts to reverse the direction of the wire delivery, thereby reducing the wire delivery angle, which would be otherwise attained by increasing an interval between the wire bobbin and the guide roller. Moreover, by virtue of the provision of the outer peripheral surface of the intermediate roller shaped into a surface designed to restrict the wire delivery angle within a predetermined angle, there can be prevented a "jump" which may take place when the wire delivery angle is beyond the predetermined angle. As a result, any fluctuation in wire tension which may be brought about by the "jump" can be effectively avoided, which contributes to the improvement in the machining accuracy, in particular, the surface roughness.

BRIEF DESCRIPTION OF THE DRAWINGS

FIG. 3 is a partially schematic top plan view illustrating a wire running onto the adjacent wire, which may be caused at the wire delivery in the conventional wire feed device;

FIG. 4 is a partially schematic sectional view illustrating a wire running onto the adjacent wire;

DESCRIPTION OF THE PREFERRED EMBODIMENTS

Figure 1:
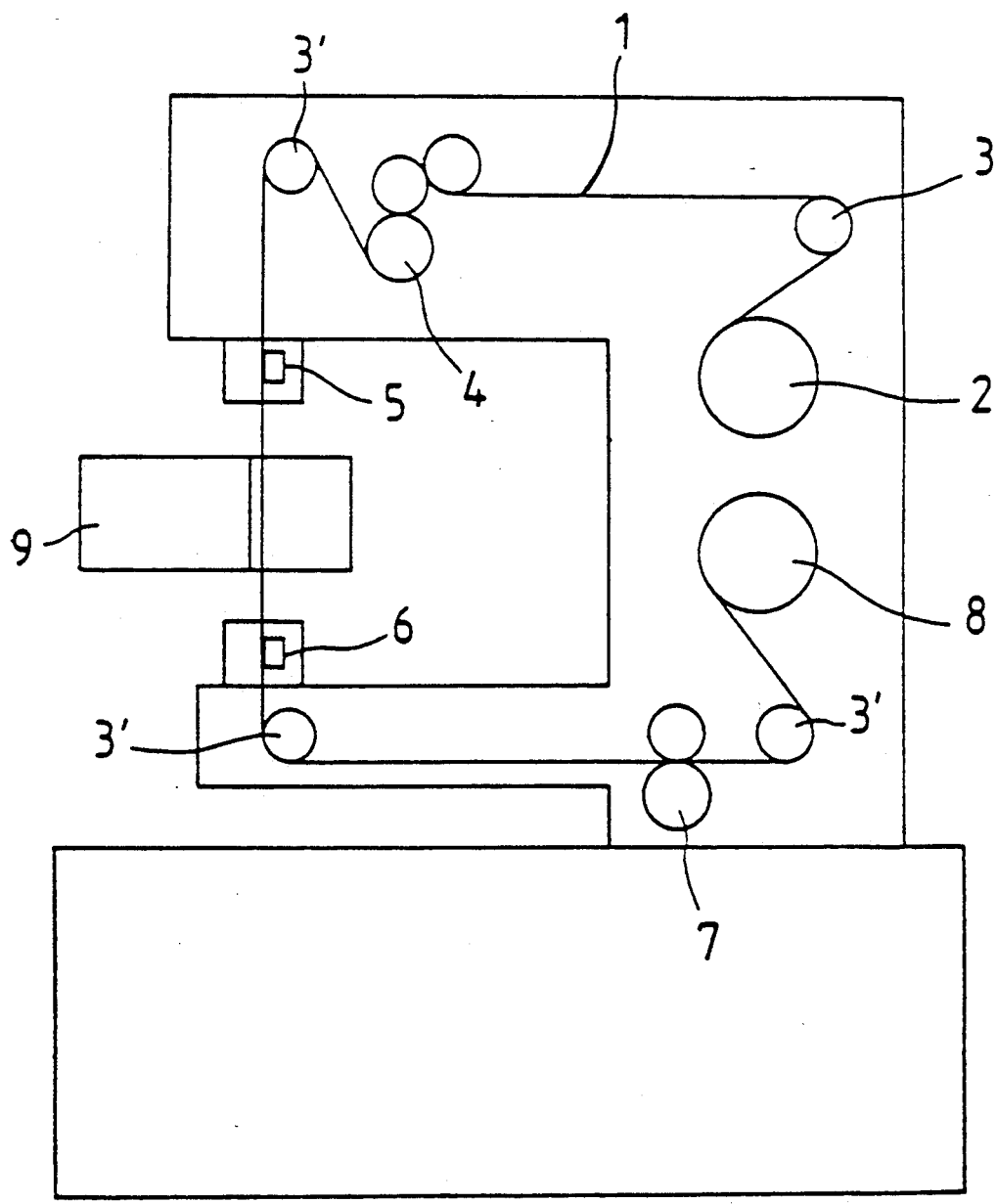
FIG. 1 is a schematic front view of the conventional wire feed device to be loaded into a wire cut electric discharge machine.

Referring now to FIG. 1, the conventional wire feed device loaded into a wire cut electric discharge machine rotationally drives a feed roller 7 by means of an electric motor (not shown) to thereby move a wire 1 accommodated in a wire bobbin 2 along a wire running path or passage extending through guide rollers 3, 3', a tension roller 4, the feed roller 7, and a take-up roller 8. The tension roller 4 adapted to impart a predetermined tension to the wire 1 is linked with a brake device (not shown) which applies a predetermined braking force to the roller 4. A pulse voltage supplied to the wire 1 from a machining power source (not shown) through electrical supply elements 5, 6 intermittently generates a spark between the wire 1 and a workpiece 9 to machine the workpiece 9.

Figure 2:
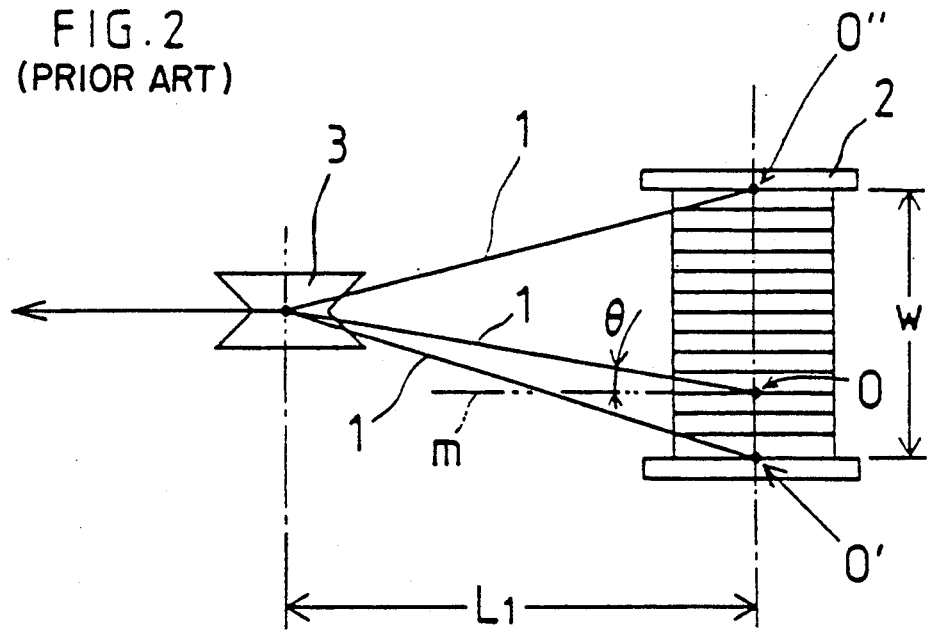
FIG. 2 is a schematic top plan view illustrating a wire delivery from a wire bobbin to a guide roller performed in the conventional wire feed device.

Referring next to FIG. 2, the guide roller 3 is disposed facing the middle of the wire bobbin 2 in the width direction thereof. The wire bobbin 2 has a width W of, for example, 100 to 200 mm. With the rotation of the feed roller 7, the wire 1 accumulatively wound-up in the wire bobbin 2 is drawn out from the wire bobbin 2 while rotating the wire bobbin 2. During the drawing out of the wire 1, a wire delivery position O in the wire bobbin is allowed to shift between one end position O' of the bobbin and the other end position O" of the bobbin in the width direction thereof, and hence there varies a wire delivery angle $\theta$ which is defined by an imaginary line m horizontally extending through the wire delivery position O and orthogonally to the axis of the wire bobbin 2, and a straight line obtained by projecting the wire 1 delivered from the wire bobbin 2 onto an imaginary horizontal plane extending through the wire delivery position O. When the wire delivery angle is large, the wire 1 may run onto an adjacent wire as diagramatically shown in FIGS. 3 and 4. Also, the wire which has run onto the adjacent wire may return to the normal wind-up position with the shift of the wire delivery position. When such "jump" of the wire takes place, the tension of the wire varies to lower the machining accuracy.

In the view of the present inventor, the wire delivery angle must be about 3 degrees or less in order to prevent this "jump" of the wire. Accordingly, in the case of the wire bobbin having a width of 160 mm, an interval L1 required between the wire bobbin and the guide roller 3 is at least 1526 mm, resulting in a necessity of providing a rather wide space for the arrangement of the device, which is not practical.

Figure 5:
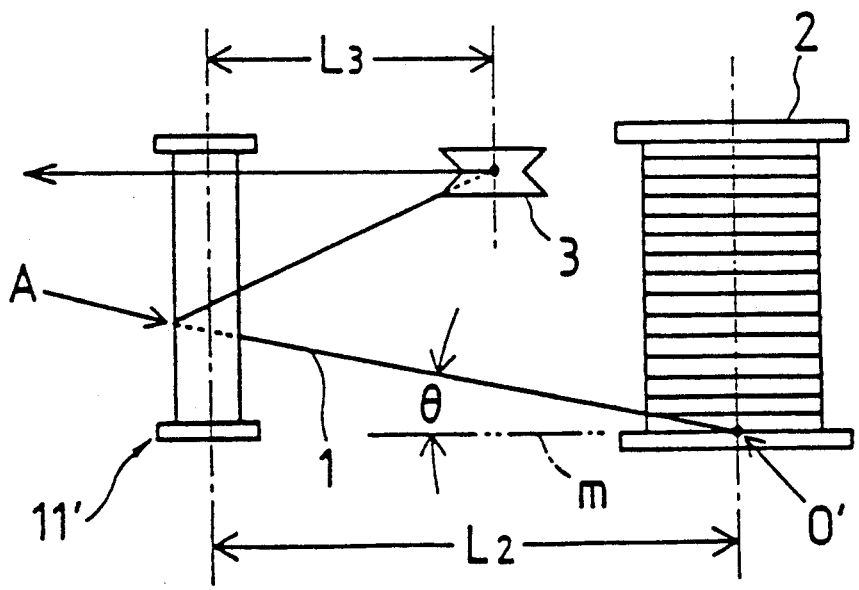
FIG. 5 is a schematic plan view illustrating a wire delivery with a right circular cylindrical roller intervening between a wire bobbin and a guide roller.

Therefore, as shown in FIG. 5, the wire 1 from the wire bobbin 2 may be delivered by way of a right circular cylindrical intermediate roller 11' interposed between the wire bobbin 2 and the guide roller 3, thereby ensuring the same effect as the case where the wire bobbin 2 is spaced from the guide roller 3 with an interval equal to the sum of an interval L2 between the wire bobbin 2 and the intermediate roller 11', and an interval L3 between the intermediate roller 11' and the guide roller 3. By virtue of the interposition of the intermediate roller, a space occupied by device components associated with the wire delivery from the wire bobbin 2 to the guide roller 3 can be surely substantially halved. The occupied space is, however, not to be further reduced. That is, the right circular cylindrical intermediate roller 11' merely intervening between the wire bobbin 2 and the guide roller 3 still permits the wire delivery angle $\theta$ to vary with the shift in the wire delivery position O, and hence the wire delivery angle $\theta$ is enlarged to bring about a "jump" of the wire, providing that the interval L2 between the wire bobbin 2 and the intermediate roller 11' is insufficient.

Figure 6:
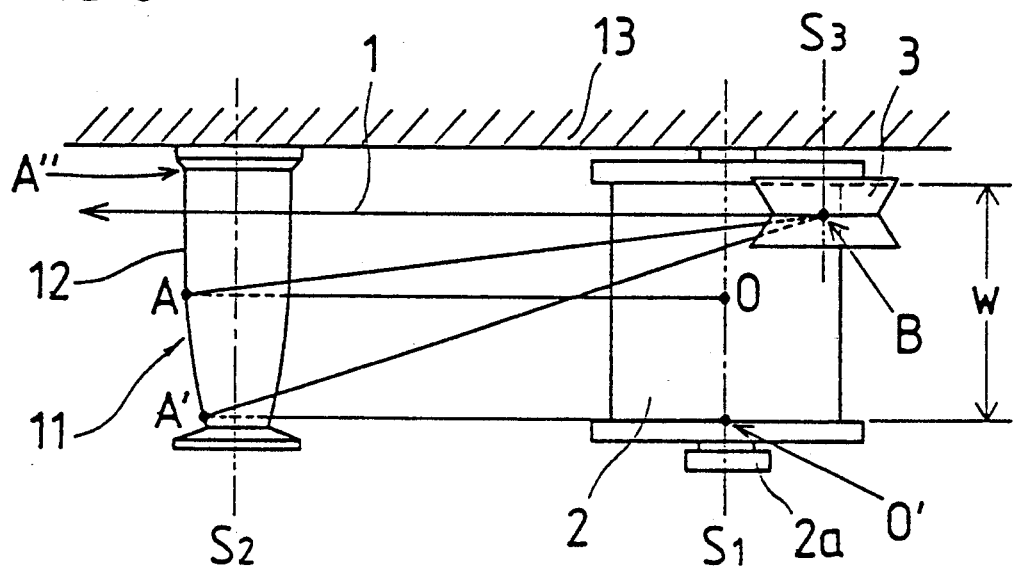
FIG. 6 is a schematic top plan view illustrating a wire feed device in accordance with an embodiment of the present invention.

A wire feed device according to an embodiment of the present invention will be described hereinbelow with reference to FIGS. 6 to 8.

The wire feed device of this embodiment having basically the same structure as the conventional wire feeding device as shown in FIG. 1 includes an intermediate roller 11 similar to the intermediate roller 11' illustrated in FIG. 5. Hereinafter, description of elements identical to those shown in FIGS. 1 through 5, inclusive, will be partly omitted.

Figure 7:
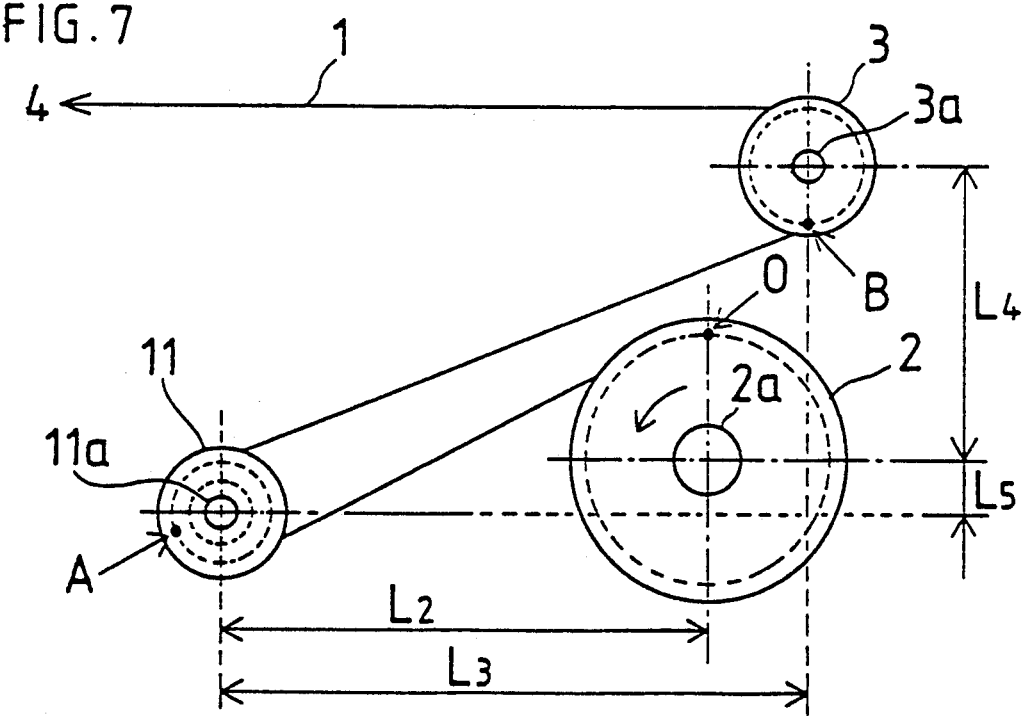
FIG. 7 is a schematic front view of a principal part of the wire feed device shown in FIG. 6.

To a side wall of a column 13 of the electric discharge machine, there are rigidly fixed correspondingly bases of a first to third shaft members 2a, 11a and 3a best shown in FIG. 7 and extending parallel to one another. On the shaft members 2a, 11a and 3a, there are mounted a wire bobbin 2, the intermediate roller 11 and a guide roller 3, respectively, each being rotatably carried by their respective shaft members. Reference numerals S1, S2 and S3 denote axes of the wire bobbin 2, the intermediate roller 11 and the guide roller 3, each extending parallel to one another.

The wire bobbin 2 includes a wire winding peripheral surface having a width of, for example, 135 mm, around which a brass wire 1 having, for example, a diameter of 0.2 mm and a total weight of 5 Kg is accumulatively wound up as shown in FIG. 4. During the rotation of the wire bobbin 2, between the wire bobbin 2 and the first shaft member 2a carrying the bobbin 2 there arises a frictional force which causes a braking force of about 200 grams to be exerted on the wire bobbin 2, thereby preventing an idling of the wire bobbin as well as applying a small back tension to the wire 1.

The guide roller 3 having a V-grooved peripheral surface along which the wire 1 runs is arranged above one end of the wire bobbin 2 closer to the column 13, and oppositely to the intermediate roller 11 with respect to the axis S1 of the wire bobbin 2. A vertical interval L4 between the wire bobbin axis S1 and the guide roller axis S3, and a horizontal interval (=L3−L2) are, for example, 167 mm and 60 mm, respectively.

The intermediate roller 11 includes an outer peripheral surface 12 on which the wire 1 runs and which has substantially the same width as that of the wire winding peripheral surface of the wire bobbin 2. The intermediate roller 11 is arranged oppositely to the guide roller 3 with respect to the wire bobbin axis S1 in vertical and horizontal directions. Such arrangement of the intermediate roller 11 opposed to the guide roller 3, in other words, located toward the inside of the wire feed device ensures a reduction in the space required for arranging the wire feed device. The horizontal interval L2 and the vertical interval L5 between the wire bobbin axis S1 and the intermediate axis S2 are, for example, 285 mm and 30 mm, respectively. The horizontal interval L3 and the vertical interval (=L4+L5) between the intermediate roller axis S2 and the guide roller axis S3 are, for example, 345 mm and 197 mm, respectively.

The outer peripheral surface 12 of the intermediate roller 11 is shaped into a curved surface to confine a wire delivery angle (which corresponds to the angle $\theta$ in FIGS. 2 and 5) within a predetermined angle, for example, 3 degrees regardless of the wire delivery position O. In this case, also, the wire delivery angle is defined by an imaginary line horizontally extending through the wire delivery position 0 on the wire bobbin 2 and perpendicularly to the wire bobbin axis S1, and a straight line obtained by projecting the wire 1 delivered from the wire bobbin 2 onto the imaginary horizontal plane extending through the wire delivery position O. Moreover, in this embodiment, the outer peripheral surface 12 of the intermediate roller 11 is shaped into a surface to unvaryingly keep, regardless of the wire delivery position O on the wire bobbin 2, a length of the wire 1 extending from the wire delivery position O to a wire contact position B of the guide roller 3 by way of a wire contact position A on the intermediate roller 11. In this embodiment, the outer peripheral surface 12 of the intermediate roller 11 can be a curved surface obtained by turning once a curve U as shown in FIG. 8 around the axis S2 of the intermediate roller 11. The curve U is given by the following procedures.

First, draw a vertical line P1 on a design drawing. Then, draw a vertical line P2 parallel to the vertical line P1 with an interval therebetween equal to a length a of the wire 1 extending from the wire delivery position O' on the wire bobbin 2 located at one end thereof opposite to the column, to a wire contact position A' on the intermediate roller 11 located at one end thereof opposite to the column. It should be noted that a length of the wire 1 derived from an intermediate wire layer is employed as the wire length a because the wire length a depends on a wire winding radius. Subsequently, draw a vertical line P3 parallel to the vertical line P2 with an interval therebetween equal to a length b of the wire 1 extending from the wire contact position A' on the intermediate roller 11 located at one end thereof opposite to the column, to the wire contact position B on the guide roller 3. Then, draw a transverse line orthogonal to the vertical lines P1 to P3. In FIG. 8, characters O', A' and C' designate points of intersection between the transverse line and the vertical lines P1 to P3, respectively. Afterward, draw a predetermined number of reference lines (one of them is designated at character OC) parallel to the transverse line O'C' with intervals equal to a value obtained by dividing the width of the wire winding surface of the wire bobbin 2 by an appropriate value. Then, plot the point B representing the wire contact position on the guide roller 3 in the design drawing. In this case, for example, first describe an arc P5 having a radius equal to the wire length b around the point A', then draw a transverse line P6 parallel to the transverse line O'C' with an interval therebetween equal to the horizontal interval between the wire delivery position O' and wire contact position B, consequently to obtain a point of intersection between the arc P5 and the transverse line P6, that is, the point B. Subsequently, draw perpendicular bisectors with respect to line segments joining the point B and intersecting points between the reference lines and the vertical line P3 (In FIG. 8, for illustrative purposes, there is only shown a perpendicular bisector P4 with respect to a line segment BC joining the point B and the point of intersection C between the reference line OC and the vertical line P3). Finally, join a row of points composed of intersecting points (one of them is designated at character A) between the perpendicular bisectors and their corresponding reference lines to thereby obtain a curve U.

Figure 8:
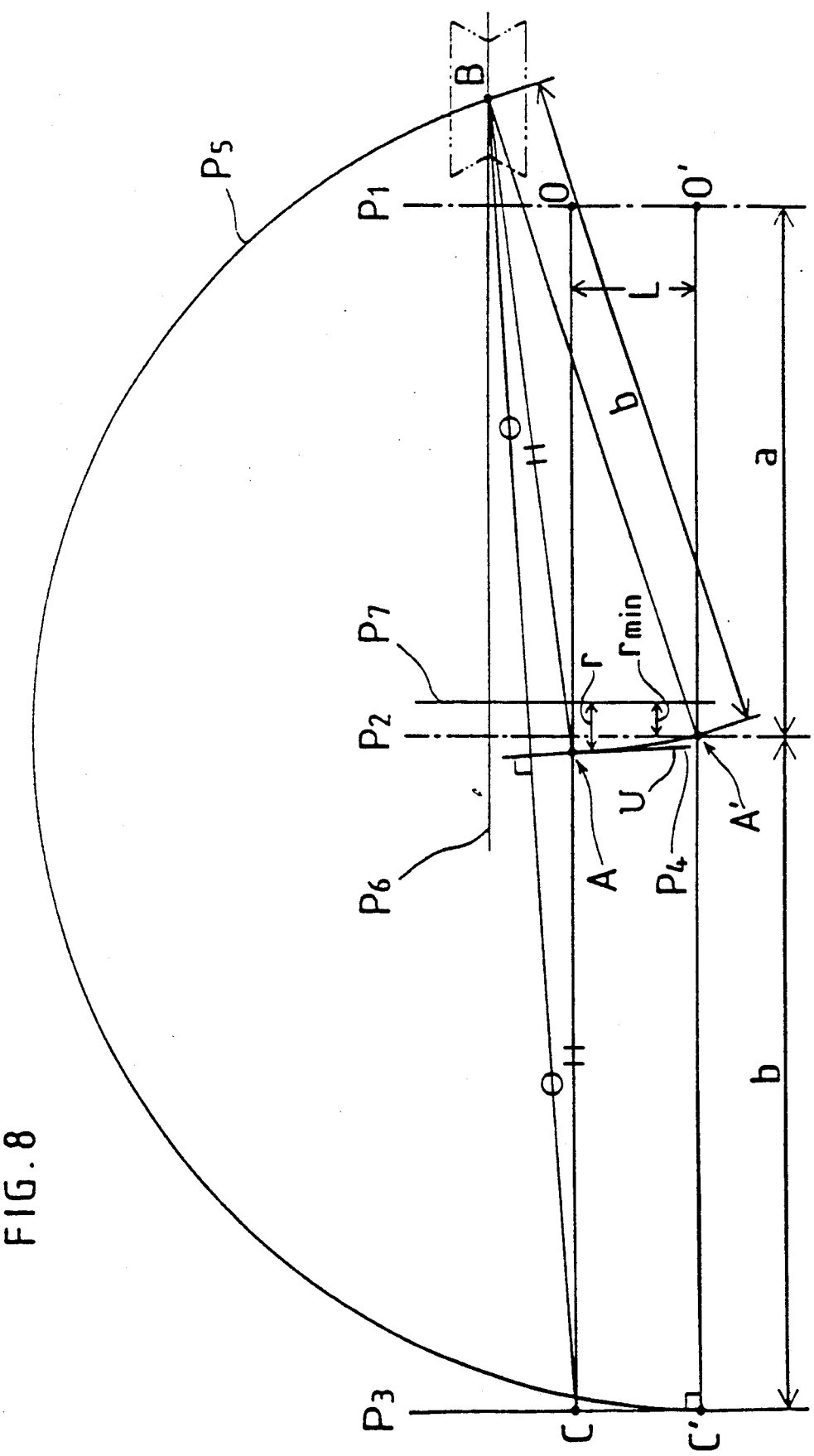
FIG. 8 is a drawing illustrating a curve required to obtain an outer peripheral curved surface of the intermediate roller shown in FIGS. 6 and 7.

As is apparent from FIG. 8, the sum of a horizontal distance from the vertical line P1 to any point resting on the curve U given as described above and a length of the line segment joining the foregoing any point and the point B, is at all times equivalent to a value a+b regardless of the wire delivery position. In other words, the curve U represents a horizontal sectional curve of the intended intermediate roller 11. That is, a radius of the intended intermediate roller 11 is represented by a horizontal distance r between the curve U and a vertical line P7 extending parallel to the vertical line P2 with an interval therebetween equal to a radius r min of the intermediate roller 11 opposite to the column. The horizontal distance r is expressed as a function of a distance L between the delivery position O' on the wire bobbin 2 located at one end thereof opposite to the column and a variable delivery position O. In this embodiment, the intermediate roller 11 presents a curved surface obtained by turning once the curve U about the vertical line P7.

Hereinbelow, description will be made of the operation of the thus constructed wire feed device.

When the electric discharge machine is actuated after loading the wire bobbin 2 with the wire 1 accumulated thereon onto the shaft member 2a, the wire 1 is tensioned as is well known in the prior art along the wire running passage extending from the wire bobbin 2 to the wire take-up roller 8 by way of the intermediate roller 11, the guide roller 3, the tension roller 4 and the tension roller 7. Subsequently, upon the initiation of the electric discharge machining, the delivery of the wire constituting the outermost layer is commenced at, for example, the delivery position O' on the wire bobbin 2 located at one end thereof opposite to the column, 13 with the rotation of the feed roller 7. At that time, the wire 1 is wound around the intermediate roller 11 at the position A' lying at one end thereof opposite to the column.

By virtue of the outer peripheral surface 12 of the intermediate roller 11 shaped into the above-described curved surface, is the wire feed angle $\theta$ is confined within a predetermined angle, for example, 3 degrees or less at the initiation of the wire delivery, and the subsequent wire 1 is delivered toward the intermediate roller 11 in the direction substantially orthogonal to the bobbin axis S1. Also, there arises a frictional force between the wire bobbin 2 and the shaft member 2a to thereby apply a small braking force to the bobbin 2, which in turn exerts a back tension onto the wire 1. The restriction of the wire delivery angle within the predetermined angle ensures an accurate prevention of "jump" of the wire 1 which may be caused by an angle exceeding the predetermined angle, and produces no variation in the wire tension which would otherwise bring about a deterioration in the machining accuracy. Furthermore, the intermediate roller 11 acts to reverse the delivery direction of the wire 1 let out from the wire bobbin 2, thus dispatching the subsequent wire 1 toward the guide roller 3.

With the progress of the wire delivery, the wire delivery position O on the wire bobbin 2 is caused to shift in the width direction of the bobbin 2 from the position O' at one end thereof toward the position O" at the other end thereof. This shift of the wire delivery position O causes the wire contact position A on the intermediate roller 11 to shift in the width direction of the intermediate roller 11 from the position A' at one end thereof toward the position A" at the other end thereof.

Since the outer peripheral surface 12 of the intermediate roller 11 is fashioned into the curved surface described above, the wire delivery angle $\theta$ is at all times restricted within the predetermined angle regardless of the wire delivery position O, the length of the wire 1 extending from the wire delivery position O on the wire bobbin 2 up to the wire contact position B on the guide roller 3 is at all times kept at a constant value (=a+b). In consequence, the "jump" of the wire 1 is not seen.

When the wire delivery of the outermost wire layer is completed, the subsequent wire layer is subjected to the wire delivery. At that time, the wire delivery position O is shifted in the opposite direction to that of the shift of the delivery position of the wire derived from the outermost wire layer, while letting out the subsequent wire 1 from the bobbin 2. In the same manner as the wire delivery of the outermost layer, regardless of the wire delivery position O, the wire delivery angle $\theta$ is always confined within the predetermined angle, and the length of the wire extending from the wire delivery position O up to the wire contact position B is at all times kept at a constant value, to consequently prevent the "jump" of the wire 1. Thus, the electric spark machining can be effected at a greater accuracy without being subjected to any fluctuation in the wire tension.

The present invention is not intended to be limited to the above embodiment, and a variety of modifications are acceptable.

In the above embodiment, for example, the intermediate roller 11 is formed to present a curved surface determined in accordance with the above description with reference to FIG. 8. Alternatively, for the intermediate roller 11 there may be employed any surface closely resembling the above curved surface as long as it is capable of restricting the wire delivery angle $\theta$ within the predetermined angle regardless of the wire delivery position O. In this case, for example, after the establishment of the curve U shown in FIG. 8, an arc having a larger radius (not shown) is described around its center resting on a line not shown which passes through the point B and is parallel to the transverse line O'C', to thereby approximate the curve U for machining. An arc having a radius of 760 mm may be used to approximate the curve U shown in FIG. 8 providing the wire bobbin 2, the intermediate roller 11 and the guide roller 3 are each sized and positioned in the same manner as in the above embodiment. Then, the outer peripheral surface 12 of the intermediate roller 1 is formed into a surface obtained by turning this arc once around the vertical line P7.

Alternatively, the outer peripheral surface 12 of the intermediated roller 11 may be fashioned into a surface in which a normal line extending from the outer peripheral surface 12 of the intermediate roller 11 at the contact position A thereof always corresponds regardless of the contact position A to a line bisecting a bending angle of the wire 1 at the contact position A when viewed in the horizontal section. In this case, the wire delivery angle $\theta$ is at all times kept at a value "0" regardless of the wire delivery position O.

Although the intermediate roller 11 is arranged on the interior side of the wire feed device to realize the reduction in size of the device in the above embodiment, it may be disposed on the exterior side of the wire feed device instead.

What is claimed is:

1. A wire feed device for a wire cut electric discharge machine, comprising:

a wire bobbin with a wire accumulatively wound therearound; an apparatus for driving the wire in a wire delivery direction; a guide roller for guiding the wire; and an intermediate roller intervening between said wire bobbin and said guide roller in a wire running path and adapted to receive said wire and reverse said wire delivery direction toward said guide roller;

said intermediate roller including an outer peripheral surface upon which the wire moves and which restricts a wire delivery angle at all times within a predetermined small angle so that said wire let out from said wire bobbin is not subjected to a jump of said wire, providing said wire delivery angle lies within said predetermined small angle regardless of a wire delivery position on said wire bobbin, said wire delivery angle being defined by an imaginary line horizontally extending through said wire delivery position and orthogonally to the axis of said wire bobbin, and a line obtained by projecting the wire let out from said wire bobbin onto an imaginary horizontal plane extending through said wire delivery position.

2. A wire feed device according to claim 1, wherein said outer peripheral surface is formed into a surface which keeps at a constant value a length of the wire extending from said wire delivery position on said wire bobbin up to said guide roller by way of said intermediate roller, regardless of said wire delivery position.

3. A wire feed device according to claim 1, wherein said wire bobbin, said intermediate roller and said guide roller are arranged in such a manner that their respective axes are parallel to one another.

4. A wire feed device according to claim 1, wherein said intermediate roller has the same width as that of a wire winding peripheral surface of said wire bobbin.

5. A wire feed device according to claim 1, wherein said intermediate roller is disposed on the interior side of the wire feed device.

6. A wire feed device according to claim 1, wherein said wire delivery angle is 3 degrees or less.

7. A wire feed device according to claim 1 wherein the longitudinal cross section of the intermediate roller is substantially U-shaped.

* * * * *